United States Patent [19]
Shah et al.

[11] Patent Number: 5,239,377
[45] Date of Patent: Aug. 24, 1993

[54] DEVICE FOR SPLITTING A DIGITAL INTERLACED TELEVISION SIGNAL INTO COMPONENTS

[75] Inventors: Imran A. Shah; Rob A. Beuker, both of Eindhoven, Netherlands

[73] Assignee: U.S. Philips Corporation, New York, N.Y.

[21] Appl. No.: 898,775

[22] Filed: Jun. 12, 1992

[30] Foreign Application Priority Data

Jun. 24, 1991 [NL] Netherlands .................. 9101080

[51] Int. Cl.⁵ ............. H06N 7/01; H06N 11/20; H06N 7/12
[52] U.S. Cl. ........................ 358/133; 358/11; 358/140
[58] Field of Search ........... 358/141, 140, 11, 12, 358/133

[56] References Cited

U.S. PATENT DOCUMENTS

| | | | |
|---|---|---|---|
| 4,551,753 | 11/1985 | Nishigawa et al. | 358/140 |
| 4,868,654 | 9/1989 | Juri et al. | 358/141 |
| 4,947,243 | 8/1990 | Wendland et al. | 358/21 R |
| 4,979,041 | 12/1990 | Schreiber | 358/141 |
| 5,097,331 | 3/1992 | Chen et al. | 358/138 |
| 5,101,273 | 3/1992 | Gillies et al. | 358/140 |
| 5,115,309 | 5/1992 | Hang | 358/133 |

FOREIGN PATENT DOCUMENTS 2654887 5/1991 France .

Primary Examiner—John K. Peng
Attorney, Agent, or Firm—Edward W. Goodman

[57] ABSTRACT

Device for splitting a digital interlaced television signal into components in which interlaced frames are applied to a vertical low-pass filter (6). To prevent motion artefacts in the spatial signal thus obtained, the interlaced frame is also applied to a vertical high-pass filter (8). This vertical high-pass filter supplies a motion auxiliary signal which may have a small vertical bandwidth. When combining the spatial signal and the motion auxiliary signal, noticeable motion artefacts do not occur in the interlaced frame. The device may be used for deriving a standard television signal from a high-definition television (HDTV) signal and for compatible transmission of HDTV signals.

17 Claims, 8 Drawing Sheets

DEVICE FOR SPLITTING A DIGITAL INTERLACED TELEVISION SIGNAL INTO COMPONENTS

FIELD OF THE INVENTION

The invention relates to a device for splitting a digital interlaced television signal into components. A device of this type is used, for example, for reducing the resolution of a television signal, for producing a multi-resolution signal or for data compression. More specifically, the invention may be used for deriving an interlaced low-definition television signal from an interlaced high-definition (HDTV) television signal and for compatible transmission of HDTV signals. The invention also relates to a device for reconstructing an interlaced television signal from said components.

BACKGROUND OF THE INVENTION

In order to transmit or store television signals efficiently, the signal is often digitized and coded. In the case of digitization, the television signal is sampled so that discrete pixels are obtained, each represented by a number of bits. In the case of coding, the pixels are converted into code words for transmission or storage. The coding causes the number of bits required for transmitting or storing the code words to be considerably smaller than the number of bits which is required for transmitting the original pixels. The television signal is subsequently reconstructed from the code words as satisfactorily as possible. To realize a picture quality which is as satisfactory as possible at a given bit rate, the digital television signal is processed prior to coding. An example of processing television signals is low-pass filtering which is used to reduce the resolution of the television picture.

A device for processing interlaced television signals is known from Reference [1]. In this known device, a signal having a reduced resolution is derived from a television signal by means of processing. More specifically, a compatible standard television (SDTV) signal is derived from a high-definition television (HDTV) signal. The SDTV signal is obtained by applying the HDTV signal to a vertical low-pass filter. The output signal of the vertical low-pass filter thus comprises a low-frequency portion of the input signal in the vertical direction and is hereinafter referred to as the baseband signal or spatial signal. After it has been subjected to a horizontal low-pass filtering, this signal may be displayed on standard television receivers. As described in the Reference, the SDTV signal could also be obtained by intraframe processing of the video signal in which the vertical filtering is applied to each HDTV frame. However, unacceptable motion artefacts then occur. As will be explained hereinafter, these motion artefacts are an inherent result of the vertical filtering. Therefore, field processing is used in the known device. This means that the two interlaced fields constituting a television frame are filtered separately. However, as described in the Reference, field processing increases the bit rate. Moreover, different vertical filters appear to be required for the two fields, which increases the complexity of such a compatible transmission system.

SUMMARY OF THE INVENTION

It is an object of the invention to provide a device for intraframe processing of interlaced television signals in which noticeable motion artefacts do not occur.

According to the invention, the device therefore comprises a first filter having a vertical low-pass filter action for generating a spatial signal and a second filter having a vertical high-pass filter action for generating a motion auxiliary signal, the vertical filter frequencies of the first and the second filter being not both equal to $\frac{1}{2}\pi$ in, which $\pi$ corresponds to half the vertical sampling frequency. Interlaced frames of the television signal are applied to the two filters.

If the spatial signal and the motion auxiliary signal are combined again, no noticeable motion artefacts appear to occur when the combined signal is being displayed. The motion signal may have a small bandwidth in this case. The intraframe processing has the further advantage that the interlaced frame can now be coded more efficiently than two fields. It is notably found that the motion signal can be coded efficiently. The television signal can therefore be transmitted at a lower bit rate.

The invention is based on the recognition that the two-dimensional frequency spectrum of an interlaced television frame splits up in two parts upon motion. The first part, referred to as baseband component or spatial signal, comprises the low spatial frequencies and is largely determined by the spatial contents of the television frame. If only this spatial signal were displayed, motion artefacts would be produced. The second part is an alias component having high vertical frequencies and is produced as a result of the motion in the interlaced frame. The two parts are motion-dependent. In the absence of motion, the alias component is absent. Both signals are now subjected to coding and transmission or storage. After decoding and combining the two signals, unwanted motion artefacts are found to be substantially absent. It is sufficient for the motion auxiliary signal to comprise a relatively small part of the frequency spectrum.

An embodiment of the device is characterized in that the vertical low-pass filter and the vertical high-pass filter are coupled to vertical subsamplers and are further coupled to horizontal low-pass filter means, horizontal high-pass filter means and horizontal subsampler means. Four signals are generated by these means, namely a low-pass spatial signal, a high-pass spatial signal, a low-pass motion auxiliary signal and a high-pass motion auxiliary signal. This embodiment has considerable advantages over the known device. The device is less complicated because it does not require different filters for different fields. The vertical filter frequencies may further be freely chosen. Moreover, said four signals combined need not cover the entire HDTV frequency spectrum, which renders an efficient coding of the television signal possible. The SDTV signal is now reconstructed from the low-pass spatial signal and the low-pass motion auxiliary signal. No noticeable motion artefacts then occur. The HDTV signal is reconstructed from all four signals, with no noticeable motion artefacts occurring either.

REFERENCES

[1] M. Breeuwer and P. H. N. de With, Source Coding of HDTV with Compatibility to TV, SPIE Visual Communications and Image Processing Vol. 1360, 1990, pp. 765-776

[2] William K. Pratt, Digital Image Processing, John Wiley & Sons, 1978

[3] Ronald E. Crochiere, Lawrence R. Rabiner, Multirate Digital Signal Processing, Prentice-Hall, Inc., 1983

DESCRIPTION OF EMBODIMENTS

Figure 1:
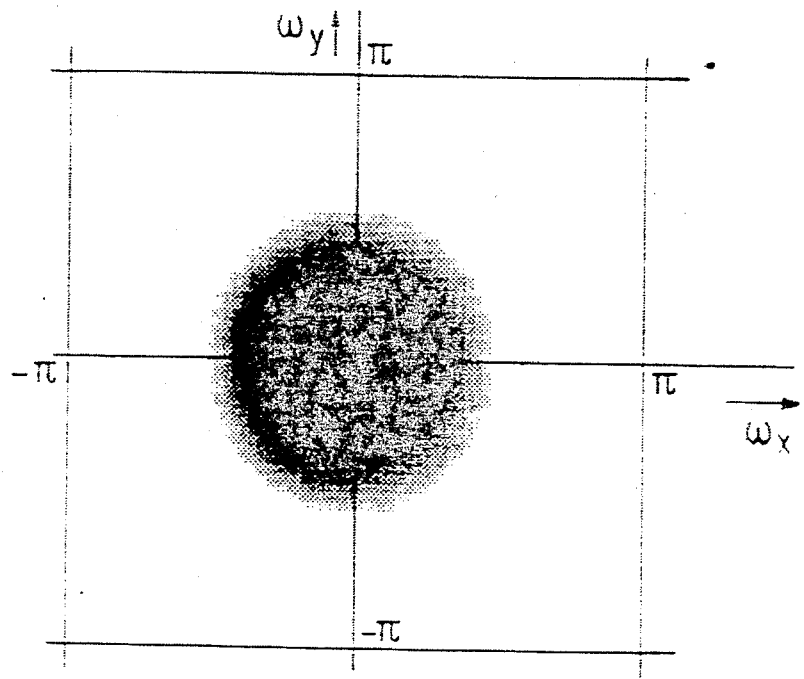
FIG. 1 shows an example of the frequency spectrum of an interlaced television frame without motion.

1. Brief summary of digital signal processing

A digital signal $f(n)$ is obtained by sampling an analog signal $f(x)$ at discrete positions $n\Delta x$ where, $n=0, \pm 1, \pm 2$, etc. and $\Delta x$ is a period of the spatial sampling frequency $f_s = 1/\Delta x$. The frequency spectrum $F(\omega)$ of the signal $f(n)$ is given by the relation:

$$F(\omega) = \sum_{n=-\infty}^{\infty} f(n) e^{-jn\omega}$$

In this relation the spatial frequency $\omega$ is expressed in radians relative to the sampling frequency $f_s$. $F(\omega)$ is a periodic spectrum having a period which is equal to the sampling frequency $\omega = 2\pi$.

Details about digital signal processing can be found in References [2] and [3]. For the sake of convenience the properties of some basic signal processing operations are summarized below.

Shifting by $k$ samples:

$$y(n) = f(n - k) \qquad Y(\omega) = F(\omega) e^{-j\omega k} \qquad (1.1)$$

Subsampling by a factor $M$:

$$y(n) = f(Mn) \qquad Y(\omega) = \frac{1}{M} \sum_{k=0}^{M-1} F\left(\frac{\omega - 2\pi k}{M}\right) \qquad (1.2)$$

More particularly, subsampling by a factor 2:

$$y(n) = f(2n) \qquad Y(\omega) = \frac{1}{2} F\left(\frac{\omega}{2}\right) + \frac{1}{2} F\left(\frac{\omega}{2} - \pi\right) \qquad (1.3)$$

Upsampling by a factor $L$:

$$y(n) = f(n/L) \text{ for } n = 0, \pm L, \pm 2L, \ldots \qquad Y(\omega) = F(\omega L) \qquad (1.4)$$

$y(n) = 0$ for other $n$

Modulation:

$$y(n) = (-1)^n \cdot f(n) \qquad Y(\omega) = F(\omega - \pi) \qquad (1.5)$$

2. Analysis of an interlaced TV frame without motion

Let it be assumed that $x(u, v)$ is the two-dimensional digital representation of a television frame. Each pixel at a discrete horizontal position $u\Delta x$ and a discrete vertical position $v\Delta y$ has a pixel value $x(u, v)$. The two-dimensional frequency spectrum of the frame is then given by:

$$X(\omega_x, \omega_y) = \sum_{u=-\infty}^{\infty} \sum_{v=-\infty}^{\infty} x(u, v) e^{-j\omega_x u - j\omega_y v} \qquad (2.1)$$

In equation (2.1) $\omega_x$ and $\omega_y$ denote spatial frequencies in the horizontal and vertical directions, respectively. Both frequencies are expressed in radians relative to the respective sampling frequencies, $\omega_x = 2\pi$ thus corresponding to a horizontal sampling frequency $f_{sx} = 1/\Delta x$, and $\omega_y = 2\pi$ corresponding to a vertical sampling frequency $f_{sy} = 1/\Delta y$. The frequency spectrum $X(\omega_x, \omega_y)$ given by (2.1) is a periodic spectrum which is repeated around multiples of the frequencies ($\omega_x = \pm 2\pi$, $\omega_y = \pm 2\pi$). In the following Figures frequency spectra will only be shown within the space ($-\pi < \omega_x, \omega_y < \pi$).

An interlaced television frame comprises an even and an odd field. It is sensible to analyze the spectrum of such an interlaced frame and express it in terms of the afore-mentioned spectrum $X(\omega_x, \omega_y)$. This spectrum $X(\omega_x, \omega_y)$ is also referred to as the spectrum of the sequential frame $x(u, v)$.

The even field may be considered to be obtained by taking the even lines of the sequential frame $x(u, v)$ (which is a subsampling process) and by zeroing out the odd lines (which is an upsampling process). The subsampling process yields a spectrum $X_s(\omega_x, \omega_y)$ which, in analogy with equation (1.3), is given by:

$$X_s(\omega_x, \omega_y) = \frac{1}{2} X\left(\omega_x, \frac{\omega_y}{2}\right) + \frac{1}{2} X\left(\omega_x, \frac{\omega_y}{2} + \pi\right)$$

The upsampling process yields the spectrum $X_e(\omega_x, \omega_y)$ of the even field. In analogy with equation (1.4) this spectrum is given by:

$$\begin{aligned} X_e(\omega_x, \omega_y) &= X_s(\omega_x, 2\omega_y) \\ &= \frac{1}{2} X(\omega_x, \omega_y) + \frac{1}{2} X(\omega_x, \omega_y + \pi) \end{aligned} \qquad (2.2)$$

The odd field may be considered to be obtained by a number of successive steps:

a) firstly, the sequential frame $x(u,v)$ is vertically upshifted by one line. In analogy with equation (1.1) this yields the spectrum:

$X(\omega_x,\omega_y)e^{j\omega_y}$ b) subsequently the previously described sub and upsampling process is used, which yields:

$$\tfrac{1}{2}X(\omega_x,\omega_y)e^{j\omega_y}+\tfrac{1}{2}X(\omega_x,\omega_y+\pi)e^{j(\omega_y+\pi)}$$

c) finally, the resultant signal is vertically downshifted by one line. This yields the spectrum $X_o(\omega_x, \omega_y)$ of the odd field:

$$X_o(\omega_x,\omega_y)=\tfrac{1}{2}X(\omega_x,\omega_y)-\tfrac{1}{2}X(\omega_x,\omega_y+\pi) \quad (2.3)$$

The interlaced television frame comprises the sum of the even and odd fields. The spectrum $X_i(\omega_x, \omega_y)$ of this interlaced frame is obtained by adding their respective spectra as given by equations (2.2) and (2.3). The result of this addition can be written as:

$$X_i(\omega_x,\omega_y)=\tfrac{1}{2}X(\omega_x,\omega_y)[1+1] \\ +\tfrac{1}{2}X(\omega_x,\omega_y+\pi)[1-1] \quad (2.4)$$

or $$X_i(\omega_x,\omega_y)=X(\omega_x,\omega_y)$$

In the absence of motion, the spectrum of the interlaced frame is perfectly equal to the spectrum of the sequential frame. This is not surprising because it is irrelevant in which order of u and v the summing operation in the right-hand member of equation (2.1) is performed. Writing the spectrum in the form of equation (2.4) indicates that the spectrum may be considered as the sum of two components. The first component $\tfrac{1}{2}X(\omega_x, \omega_y)[1+1]$ represents the original baseband signal, the second component $\tfrac{1}{2}X(\omega_x, \omega_y+\pi)[1-1]$ represents an alias component due to the interlacing process. In the absence of motion the alias component is zero.

3. Analysis of an interlaced TV frame with motion

If the interlaced television frame is subjected to motion, the even and odd fields correspond to two different motion phases because the two fields have been obtained at different instants. The even field is formed by the even lines of $x(u,v)$, the odd field is formed by the odd lines of $x(u+n,v+m)$, where n and m correspond to the number of pixels by which the frame has been shifted horizontally and vertically due to the motion.

The even field is again obtained by sub-and upsampling of $x(u,v)$. In other words, the spectrum of the even field is described by the same equation (2.2) as before:

$$X_e(\omega_x,\omega_y)=\tfrac{1}{2}X(\omega_x,\omega_y)+\tfrac{1}{2}X(\omega_x,\omega_y+\pi) \quad (3.1)$$

In order to describe the spectrum of the odd field, the successive steps previously used for $x(u,v)$ are now used for $x(u+n,v+m)$. In analogy with equation (1.1), the spectrum of $x(u+n,v+m)$ is given by:

$$X(\omega_x,\omega_y)e^{j(\omega_x n+\omega_y m)}$$

a) The step of vertically upshifting the signal by one line yields:

$$X(\omega_x,\omega_y)e^{j(\omega_x n+\omega_y m)}e^{j\omega_y}$$

b) The step of sub-and upsampling yields:

$$\tfrac{1}{2}X(\omega_x,\omega_y)e^{j(\omega_x n+\omega_y m)}e^{j\omega_y} \\ +\tfrac{1}{2}X(\omega_x,\omega_y+\pi)e^{j(\omega_x n+(\omega_y+\pi)m)}e^{j(\omega_y+\pi)}$$

which can be rewritten as:

$$\tfrac{1}{2}X(\omega_x,\omega_y)e^{j(\omega_x n+\omega_y m)}e^{j\omega_y} \\ +-\tfrac{1}{2}X(\omega_x,\omega_y+\pi)e^{j(\omega_x n+(\omega_y+\pi)m)}e^{j\omega_y}$$

c) The step of vertically downshifting by one line yields:

$$X_o(\omega_x,\omega_y)=\tfrac{1}{2}X(\omega_x,\omega_y)e^{j(\omega_x n+\omega_y m)} \\ -\tfrac{1}{2}X(\omega_x,\omega_y+\pi)e^{j(\omega_x n+(\omega_y+\pi)m)} \quad (3.2)$$

The spectrum of the interlaced television frame with motion is again obtained by adding the spectra given by the equations (3.1) and (3.2):

$$X_i(\omega_x,\omega_y)=\tfrac{1}{2}X(\omega_x,\omega_y)[1+e^{j(\omega_x n+\omega_y m)}] \\ +\tfrac{1}{2}X(\omega_x,\omega_y+\pi)[1-e^{j(\omega_x n+(\omega_y+\pi)m)}]$$

Using the equality $e^{j\pi m}=(-1)^m$ this can rewritten as:

$$X_i(\omega_x,\omega_y)=\tfrac{1}{2}X(\omega_x,\omega_y)[1+e^{j(\omega_x n+\omega_y m)}]+ \\ \tfrac{1}{2}X(\omega_x,\omega_y+\pi)[1-(-1)^m e^{j(\omega_x n+\omega_y m)}] \quad (3.4)$$

Like equation (2.4) giving the spectrum for an interlaced frame without motion, equation (3.4) may be considered as the sum of a baseband component and an alias component. The original baseband signal is multiplied (or filtered) by the term $[1+\ldots]$, the alias component by the term $[1-\ldots]$. Both components are thus differently affected by motion.

4. Interpretation

Insight will be gained if equation (3.4) is interpreted for several typical cases. For such an interpretation, a two-dimensional gaussian function is assumed as the original sequential frame $x(u,v)$.

In the case of no motion (n=0, m=0), equation (3.4) reduces to:

$$X_i(\omega_x,\omega_y)=X(\omega_x,\omega_y)$$

This relation shows the complete absence of aliasing. FIG. 1 shows an example of such a frequency spectrum. It is the same spectrum as that of the sequential frame $x(u,v)$ and does not show any artefacts.

A diagonal motion by four pixels (n=4, m=4) is now introduced. In that case equation (3.4) becomes:

$$X_i(\omega_x,\omega_y)=\tfrac{1}{2}X(\omega_x,\omega_y)[1+e^{j(4\omega_x+4\omega_y)}]+ \\ \tfrac{1}{2}X(\omega_x,\omega_y+\pi)[1-(-1)^4 e^{j(4\omega_x+4\omega_y)}]$$

Using the equalities $$1+e^{j2\alpha}=2e^{j\alpha}\cos\alpha$$

and $$1-e^{j2\alpha}=-2je^{j\alpha}\sin\alpha$$

this spectrum can be rewritten as:

$$X_i(\omega_x,\omega_y)=e^{2j(\omega_x+\omega_y)}[X(\omega_x,\omega_y)\cos 2(\omega_x+\omega_y) \\ -jX(\omega_x,\omega_y+\pi)\sin 2(\omega_x+\omega_y)]$$

Figure 2:
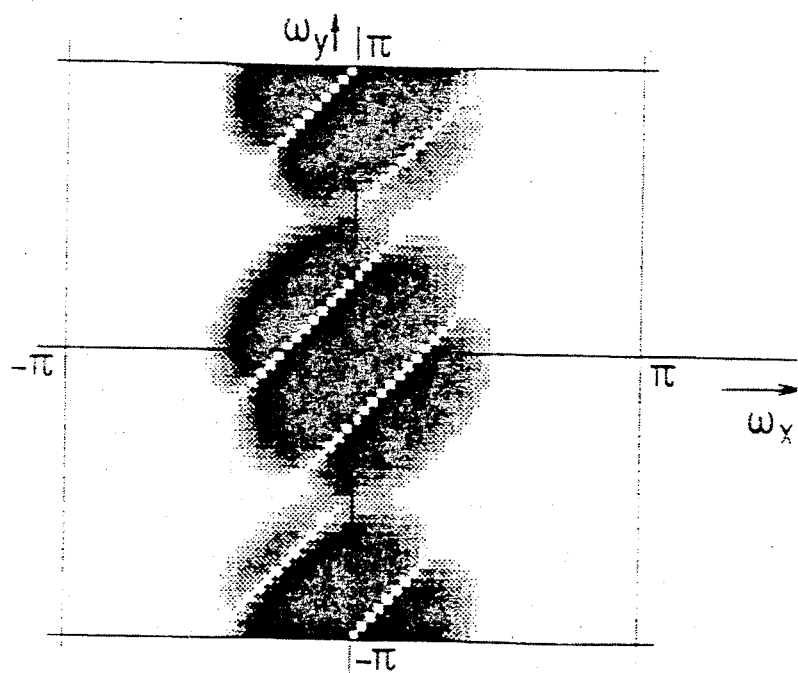
FIG. 2 shows an example of the frequency spectrum of an interlaced television frame with motion.

This spectrum is shown in FIG. 2. The multiplication (filtering) of the baseband signal by the cosine term becomes manifest as zero lines along the diagonals for which $\omega_x+\omega_y=k\pi/4$. The multiplication (filtering) of the alias term by the sine term becomes manifest as zero lines along diagonals for which $\omega_x+\omega_y=k\pi/2$. The zero lines are wider apart for low motion and closer together for higher motion.

5. Vertical low-pass filtering of an interlaced frame

Many applications of digital video processing imply low-pass filtering. For example, a video signal having a reduced resolution can be more easily coded in a data compression system than the original signal. Said reduction of the resolution can be achieved by low-pass filtering the signal before coding. Similarly, low-pass filtering is required for reconstructing a compatible SDTV signal from a HDTV signal. Generally, low-pass filtering involves horizontal as well as vertical low-pass filtering. Only vertical low-pass filtering will be considered in this section. It will be shown that said vertical low-pass filtering causes problems if the filtering operation is performed directly on interlaced television frames with motion.

Figure 3A:
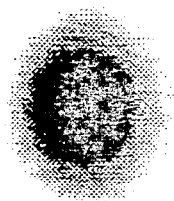
FIG. 3A-3C demonstrates the effect of vertical filtering on a moving frame.
Figure 3B:
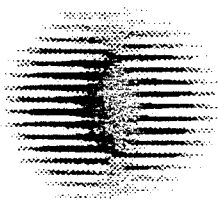

FIG. 3 demonstrates the effect of the filter on a moving object. FIG. 3a shows the original pattern x(u,v). Its spectrum is denoted by $X(\omega_x, \omega_y)$. The object is moving horizontally by 4 pixels between two fields (n=4, m=0). The interlaced television frame is shown in FIG. 3b. The difference between the even odd lines is clearly visible. If only a part of the vertical bandwidth is passed by a vertical low-pass filter, the high vertical frequencies around $\omega_y = \pm \pi$ are removed from the frequency spectrum. The spectrum $Y(\omega_x, \omega_y)$ of the output signal y(u,v) is now given by:

$$Y(\omega_x,\omega_y) = \tfrac{1}{2} X(\omega_x,\omega_y)[1 + e^{j(\omega_x n + \omega_y m)}]$$

which for n=4, m=4 becomes:

$$Y(\omega_x,\omega_y) = \tfrac{1}{2} X(\omega_x,\omega_y)[1 + e^{j4\omega_x}]$$

The spectrum given by the latter equation is the spectrum of:

$$y(u,v) = \tfrac{1}{2} x(u,v) + \tfrac{1}{2} x(u+4,v)$$

Figure 3C:
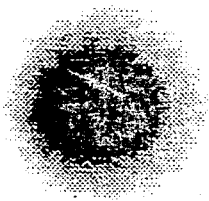

FIG. 3c shows the object thus obtained with reduced resolution. The difference between the two fields has disappeared. When displaying a sequence of these frames on an interlaced monitor, motion artefacts occur. The motion is not smooth but jerky.

6. Embodiment of resolution reduction

Figure 4:
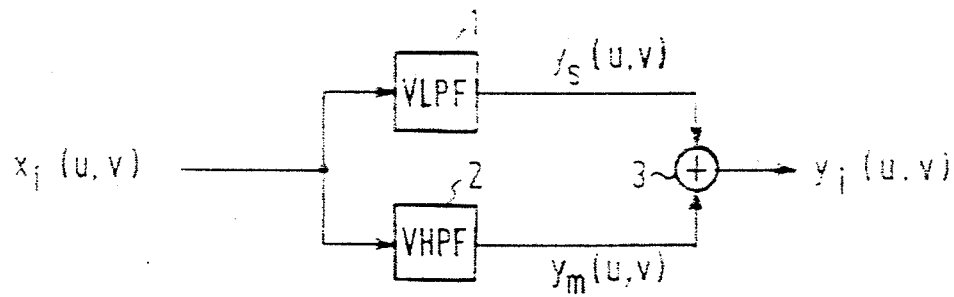
FIG. 4 shows an embodiment of a device according to the invention.

FIG. 4 shows an embodiment of a device according to the invention. More particularly, the device shown is adapted to reduce the vertical resolution of an interlaced video signal in order to render its efficient coding possible. As is shown in the Figure, an interlaced television frame $x_i(u,v)$ is applied to a vertical low-pass filter 1 and to a vertical high-pass filter 2. Low-pass filter 1 supplies a signal $y_s(u,v)$, high-pass filter 2 supplies a signal $y_m(u,v)$. After coding, transmission or storage and decoding (not shown) of these signals, they are combined again in a combination circuit 3. The interlaced output signal $y_i(u,v)$ of the device is applied to a display device (not shown).

The low-pass filter 1 causes a predetermined portion of the baseband signal to be filtered from the video signal. The output signal $y_s(u,v)$ of the filter comprises, as it were, the spatial information of the frame and is further referred to as the spatial signal. The bandwidth of the filter determines the extent of reducing the resolution. For a reduction of the resolution by a factor of 2, the bandwidth is half the original bandwidth, i.e. a quarter of the vertical sampling frequency. As already mentioned hereinbefore, frequencies $\omega$ are expressed in radians relative to the sampling frequency. The low-pass filter then has a bandwidth of $\tfrac{1}{2}\pi$.

The high-pass filter 2 causes a predetermined portion of the alias component to be filtered from the video signal. The output signal $y_m(u,v)$ of the filter comprises, as it were, a portion of the motion information and is therefore also referred to as motion auxiliary signal or "motion helper". The bandwidth of the filter determines up to what frequencies the motion information is present in the motion auxiliary signal $y_m(u,v)$.

Figure 5:
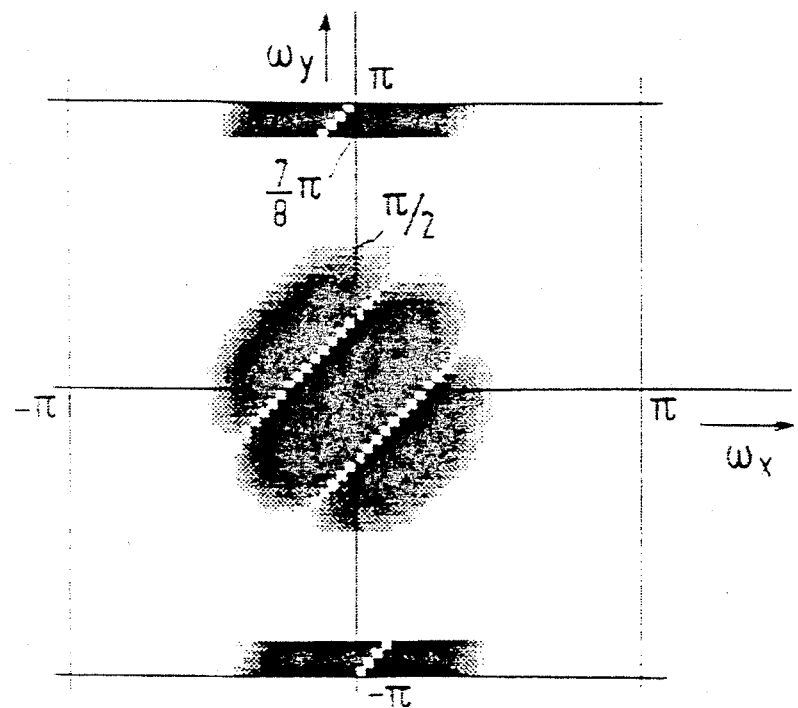
FIG. 5 shows the frequency spectrum of the output signal of the device of FIG. 4.

As described in the previous section, the spatial signal $y_s(u,v)$ of the low-pass filter 1 is of itself subject to motion artefacts in the case of motion when it is being displayed on a monitor. By adding the motion auxiliary signal $y_m(u,v)$ to the baseband signal, the motion artefacts are largely compensated. The extent to which motion artefacts still occur depends on the spatial frequency contents of the frame, the bandwidth of the high-pass filter and, to a lesser extent, the quantity of motion. It should be borne in mind that the spectrum of the alias component is a replica of the spectrum of the baseband signal, multiplied by a motion-dependent term. Where the frequencies around $\omega_y = 0$ are the most important frequencies for the baseband signal, the frequencies around $\omega_y = \pm \pi$ are most relevant for the motion auxiliary signal. The vertical high-pass filter may therefore have a narrow band in practice. Practical experiments have proved that a bandwidth of $\tfrac{1}{8}\pi$ is sufficient to render motion artefacts completely or substantially completely unnoticeable. FIG. 5 shows the frequency spectrum $Y_i(\omega_x, \omega_y)$ of the output signal $y_i(u,v)$ of the device shown in FIG. 4.

The device according to the invention has the great advantage that the different filter frequencies can be chosen independently of each other. This is important because the two components can then be optimally chosen for further coding.

7. Embodiments for HDTV to SDTV conversion

The frame of a digital HDTV signal comprises two interlaced fields of 576 lines each and 1440 pixels per line. The frame of an SDTV signal comprises two interlaced fields of 288 lines each and 720 pixels per line and thus comprises a quarter of an HDTV frame. In order to provide the possibility of compatibility between the novel HDTV system and the existing SDTV system, it should be possible to derive the SDTV signal from an HDTV signal.

Figure 6:
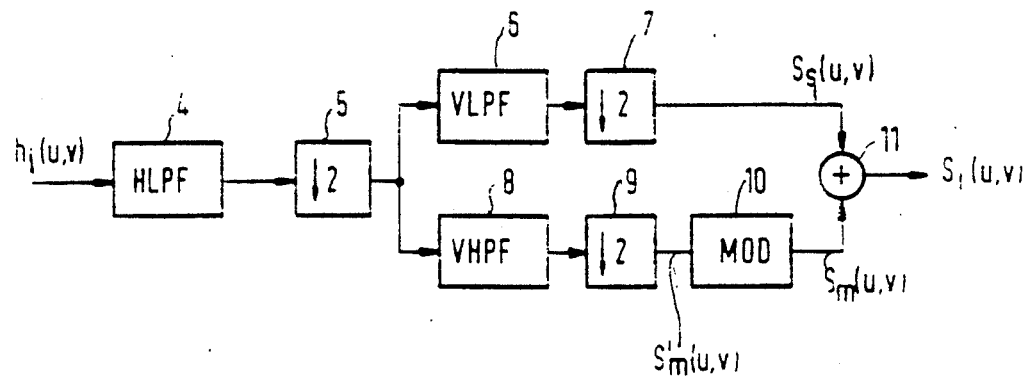
FIG. 6 shows a device for deriving a digital SDTV signal from a digital HDTV signal.

FIG. 6 shows a device for converting a digital HDTV signal into a digital SDTV signal. The interlaced HDTV frame, denoted by $h_i(u,v)$, is applied to a horizontal low-pass filter 4 and subsequently to a horizontal subsampler 5. The output signal of subsampler 5 is applied to a vertical low-pass filter 6 and a vertical subsampler 7 for constructing a spatial signal $s_s(u,v)$. The output signal of the subsampler 5 is also applied to a vertical high-pass filter 8 and a vertical subsampler 9 for constructing a motion auxiliary signal $s'_m(u,v)$. After possible coding, transmission or storage and decoding (not shown), the motion auxiliary signal $s'_m(u,v)$ is applied to a modulator 10. The modulated motion auxiliary signal $s_m(u,v)$ and the spatial signal $s_s(u,v)$ are applied to a combination circuit 11. This circuit supplies the interlaced SDTV signal $s_i(u,v)$ at its output.

The device of FIG. 6 will be explained with reference to the frequency spectra of various signals which occur in the Figure. These spectra are shown in FIGS.

Figures 7A, 7B:
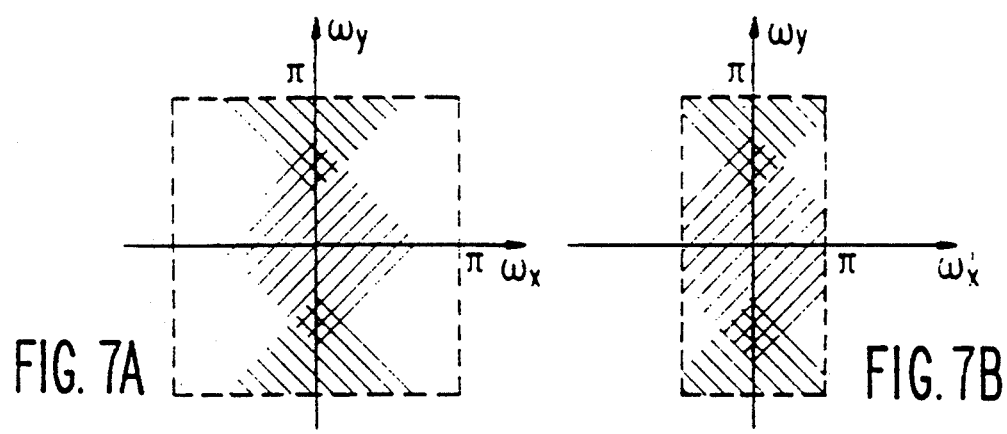
FIGS. 7A-7G show some frequency spectra to explain the operation of the device of FIG. 6.

7A-7G. FIG. 7A shows diagrammatically an example of the frequency spectrum of the interlaced television frame $x_f(u,v)$. The baseband component and the alias component of the interlaced frame are denoted by means of different shaded areas in this Figure. For the sake of completeness it is to be noted that the periodic repetition of the spectrum around multiples of the frequencies ($\omega_x = \pm 2\pi$, $\omega_y = \pm 2\pi$) are not shown.

The object of low-pass filter 4 is to remove horizontal frequencies $\omega_x > \frac{1}{2}\pi$ from the HDTV signal so that unwanted alias components do not occur after subsampling. FIG. 7B shows the frequency spectrum of the output signal of subsampler 5. In this Figure the horizontal spatial frequency is denoted by $\omega'_x$. It is expressed in radians relative to the horizontal SDTV sampling frequency which is half the HDTV sampling frequency. For example, the spatial frequency, which corresponds to $\omega_x = \frac{1}{2}\pi$ in FIG. 7A, now corresponds to $\omega'_x = \pi$. The periodic repetitions (not shown) of the spectrum are at multiples of $\omega'_x = \pm 2\pi$.

Figures 7C, 7D:
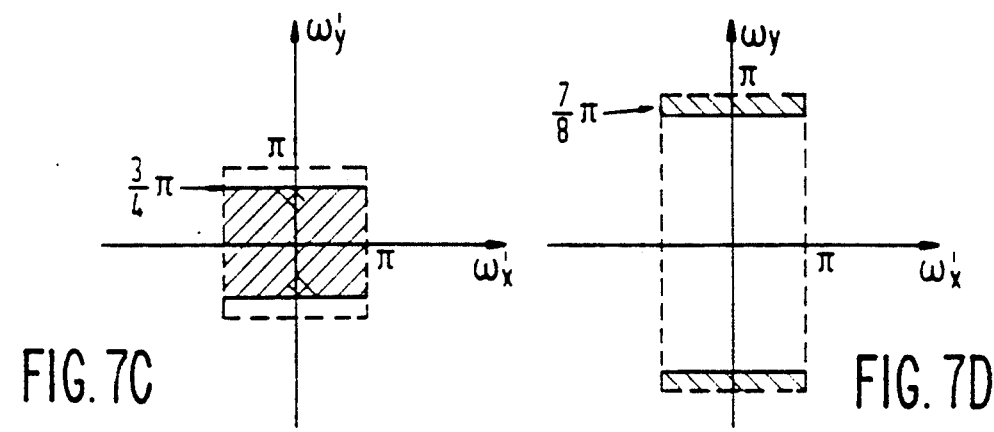

The output signal $s_s(u,v)$ of subsampler 7 has the frequency spectrum which is shown in FIG. 7C. Along the vertical axis the frequency is now denoted by $\omega'_y$ which is expressed in radians relative to the vertical SDTV sampling frequency. In order to prevent aliasing, the vertical low-pass filter 6 has a bandwidth of at most $\frac{1}{2}\pi$. In this embodiment a bandwidth of $\frac{3}{8}\pi$ is chosen. As compared with the SDTV sampling frequency, this is a bandwidth of $\frac{3}{4}\pi$. The signal $s_s(u,v)$ comprises the spatial information of the frame and forms the spatial SDTV signal.

Figures 7E, 7F:
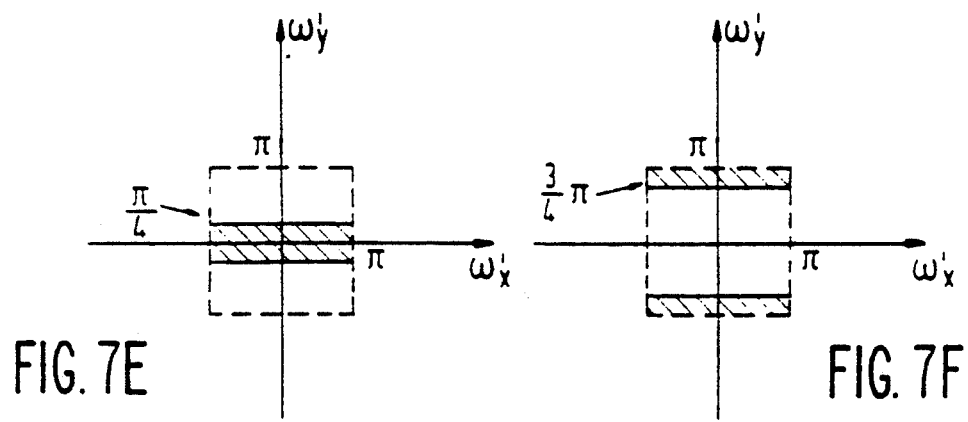

In the manner described hereinbefore, the vertical high-pass filter 8 filters the motion auxiliary signal from the frame and thereby maintains the motion information. As is shown in FIG. 7D a vertical filter bandwidth of $\frac{1}{8}\pi$ is chosen in this embodiment. The vertical sampling rate of this "motion helper" is reduced by a factor of 2 in subsampler 9. As is known (see for example section 2.4.2 of Reference [3]), the frequency spectrum of a bandpass signal is shifted to the baseband in the case of subsampling. FIG. 7E shows this frequency spectrum. As compared with the SDTV sampling frequency, it has a bandwidth of $\frac{1}{4}\pi$. The frequency band is shifted to $\omega'_y = \pi$ in modulator 10 by means of modulation so that the motion auxiliary signal $s_m(u,v)$ is formed. Its frequency spectrum is shown in FIG. 7F.

Figure 7G:
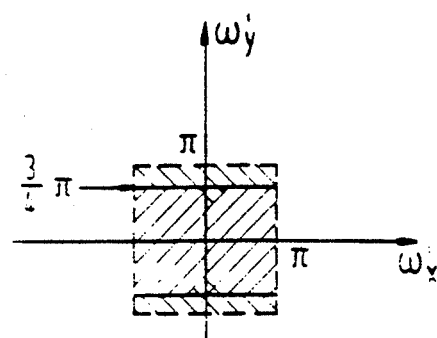

FIG. 7G shows the frequency spectrum of the SDTV signal $s_i(u,v)$ which is obtained in combination circuit 11 after combining spatial signal $s_s(u,v)$ and "motion helper" $s_m(u,v)$. Shaded areas corresponding to those in FIG. 7A indicate that the frequency spectrum comprises a portion of the original baseband component and a portion of the original alias component. It has been found in practice that motion artefacts are substantially absent in the case of interlaced display of the SDTV signal $s_i(u,v)$.

Figure 8:
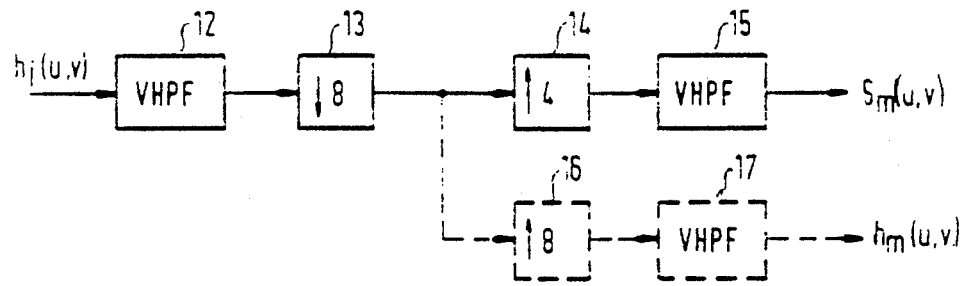
FIG. 8 shows a further embodiment of a part of the device of FIG. 6.

In the embodiment shown in FIG. 6 the SDTV motion auxiliary signal is directly derived from the HDTV frame. However, it is alternatively possible to first extract an HDTV motion auxiliary signal from the HDTV signal and to subsequently derive the SDTV motion auxiliary signal therefrom. In that case the same vertical portion of the motion information is used both for HDTV and for SDTV. FIG. 8 shows a device for this purpose. For the sake of clarity this Figure only shows the processing in the vertical direction. The interlaced HDTV frame $h_f(u,v)$ now successively traverses a vertical high-pass filter 12, a subsampler 13, an upsampler 14 and a vertical high-pass filter 15. The operation of this device is the same for vertical frequencies as the operation of the signal branch shown in FIG. 6 where it is formed by vertical high-pass filter 8, subsampler 9 and modulator 10. High-pass filter 12 filters the relevant motion information from the HDTV signal. The bandwidth of the filter may be $\frac{1}{8}\pi$ again. Subsampler 13 transports this motion information to $\omega_y = 0$, upsampler 14 repeats the motion information also at $\omega'_y = \pi$ and high-pass filter 15 filters out unwanted repetition frequencies. The modulator 10 shown in FIG. 6 can now be dispensed with. The SDTV motion auxiliary signal $s_m(u,v)$ is present at the output of vertical high-pass filter 15.

The device shown in FIG. 8 has the advantage that the same motion information at the output of subsampler 13 can also be shifted to $\omega_y = \pi$ in order to serve as the HDTV motion auxiliary signal $h_m(u,v)$. In analogy with upsampler 14 and filter 15, an upsampler 16 and high-pass filter 17 are used for this purpose. These are shown in broken lines in FIG. 8.

An important advantage of the embodiment shown in FIGS. 6 and 8 is that the vertical filter frequencies can be chosen independently of each other. In the known device there is no question of this freedom of design. It is, for example, feasible that, if this made a more effective coding possible, filter frequencies would be dimensioned in such a way that the frequency spectrum after combination of baseband component and alias component has a gap, for example, in a way as already shown in FIG. 5. The filters may alternatively be dimensioned in such a way that the baseband component and the alias component overlap each other if the interference caused thereby appears to be unnoticeable. Furthermore, it is not absolutely necessary for the spectrum of the spatial signal to be limited to $-\frac{1}{2}\pi < \omega_x, \omega_y < \frac{1}{2}\pi$.

8. Embodiment of compatible transmission

For compatible transmission, signals from which both the SDTV signal and the HDTV signal can be reconstructed should be derived from the interlaced HDTV signal. A transmission system for this purpose may be obtained, for example, by using both the device shown in FIG. 4 (for transmitting the HDTV signal) and the device shown in FIG. 6 (for transmitting the SDTV signal).

Figure 9:
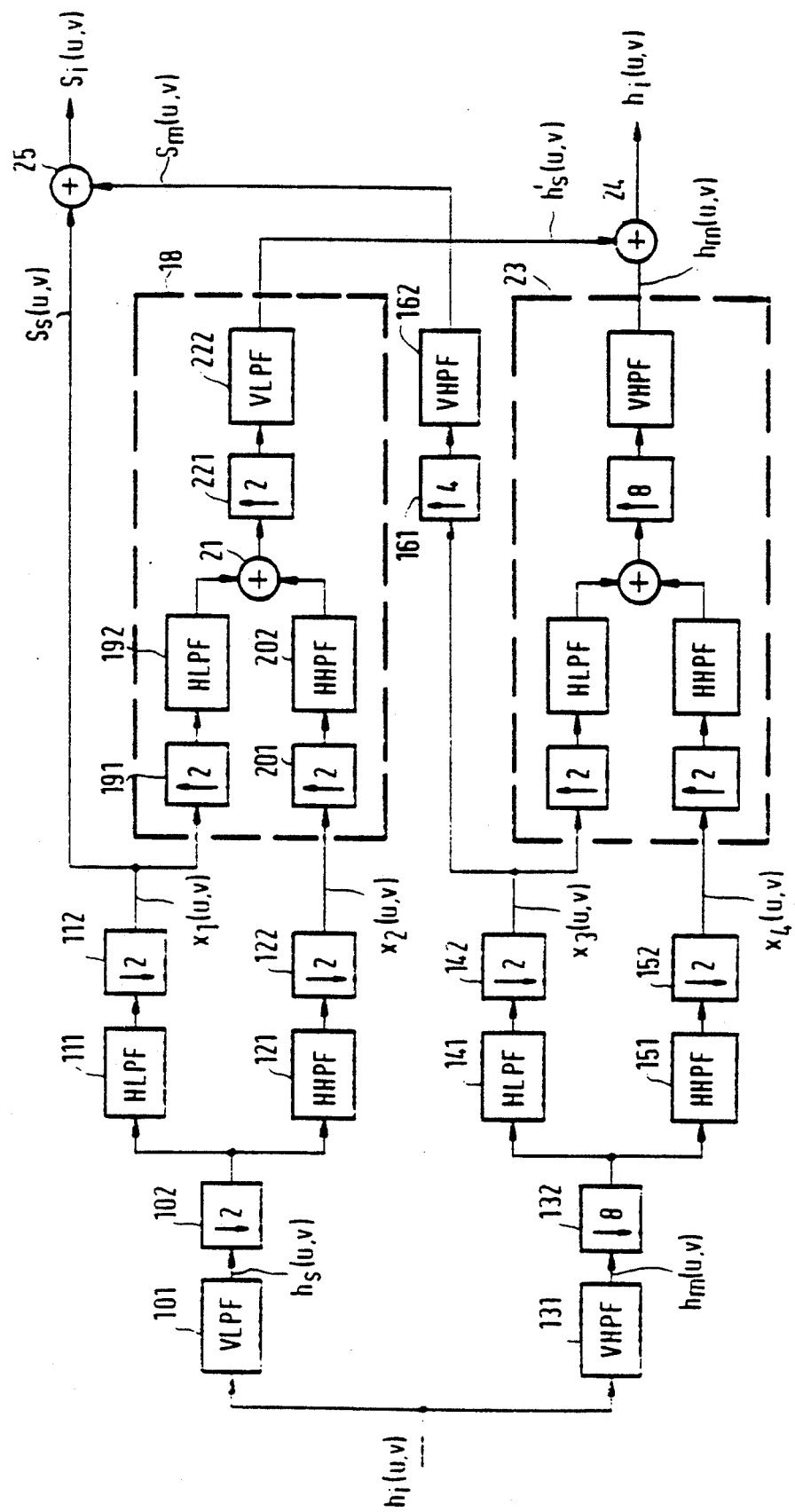
FIG. 9 shows an embodiment of a compatible transmission system.

However, in the case of compatible transmission, the overall sum of the number of transmitted samples per frame is preferably not larger than the original number of samples of the HDTV frame. FIG. 9 shows an embodiment of such a compatible transmission system.

Figure 10:
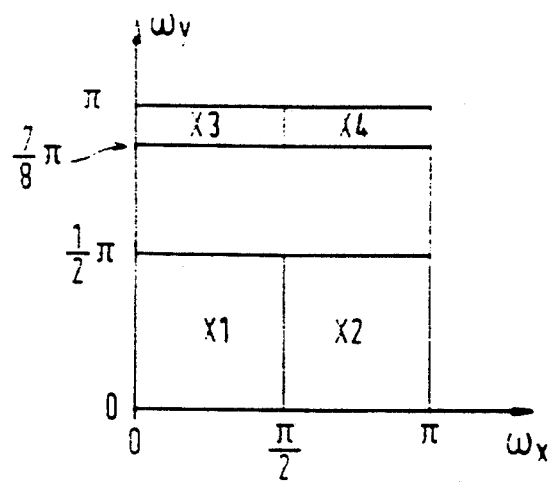
FIG. 10 shows a HDTV frequency spectrum to explain the operation of the compatible transmission system of FIG. 9.

The interlaced HDTV input signal $h_f(u,v)$ is applied to a vertical low-pass filter 101 for splitting off a spatial signal $h_s(u,v)$. After vertical subsampling (102) this spatial signal is applied to a horizontal low-pass filter 111 and to a horizontal high-pass filter 121. Both horizontal filters are succeeded by respective horizontal sub-samplers 112 and 122. In this way two spatial sub-signals are formed which are denoted by $x_1(u,v)$ and $x_2(u,v)$, respectively in the Figure. In FIG. 10 the references $X_1$ and $X_2$ denote with which portion of the HDTV frequency spectrum these two spatial sub-signals are associated.

The input signal is also applied to a vertical high-pass filter 131 for splitting off a motion auxiliary signal $h_m(u,v)$. After vertical subsampling (132) this motion signal is applied to a horizontal low-pass filter 141 and to a horizontal high-pass filter 151. Both horizontal filters are succeeded by respective horizontal subsamplers 152 and 153. In this way two motion sub-signals are formed which are denoted by $x_3(u,v)$ and $x_4(u,v)$, respectively in the Figure. The references $X_3$ and $X_4$ in FIG. 10 denote with which portion of the HDTV frequency spectrum these two spatial sub-signals are associated.

As described in the foregoing, the vertical filters 101 and 131 preferably have a different bandwidth. Low-pass filter 101 has a bandwidth of, for example, $\frac{1}{2}\pi$ and high-pass filter 131 has a bandwidth of $\frac{1}{2}\pi$. The four sub-signals $x_1(u,v)$-$x_4(u,v)$ combined therefore comprise fewer samples per frame than the HDTV input signal. It is these four sub-signals which are transmitted or stored, possibly after they have been coded. This is not further shown in the Figure. The interlaced HDTV signal as well as the interlaced SDTV signal are reconstructed at the receiver end.

The sub-signal $x_1(u,v)$ represents the spatial SDTV signal. In analogy with previously used references, this signal is also denoted by $s_s(u,v)$. The sub-signal $x_3(u,v)$ is applied to a vertical upsampler 161 and a vertical high-pass filter 162. As described hereinbefore (see FIG. 8) modulation is realized thereby and the motion auxiliary signal $s_m(u,v)$ of the SDTV signal is obtained. The spatial SDTV signal $s_s(u,v)$ and the motion auxiliary signal $s_m(u,v)$ are combined in a combination circuit 25. The output signal thus obtained is the desired interlaced SDTV signal $s_i(u,v)$.

The sub-signals $x_1(u,v)$ and $x_2(u,v)$ are applied to a circuit 18 for regaining the spatial HDTV signal $h_s(u,v)$. The circuit 18 comprises a horizontal upsampler 191 and a horizontal low-pass filter 192 for regaining, by means of interpolation, the samples which have been lost in subsampler 112. In a corresponding manner the circuit comprises a horizontal upsampler 201 and a horizontal high-pass filter 202 for regaining the samples which have been lost in subsampler 122. After combination in combination circuit 21, interpolation in the vertical direction is performed so as to regain the samples which have been lost in subsampler 102. To this end upsampler 221 and vertical low-pass filter 222 are incorporated in the circuit. The output of the circuit 18 supplies a replica $h'_s(u,v)$ of the spatial HDTV signal $h_s(u,v)$.

The sub-signals $x_3(u,v)$ and $x_4(u,v)$ are applied to a circuit 23 for regaining the motion auxiliary signal $h_m(u,v)$. The circuit 23 operates in a corresponding manner as circuit 18 and its operation will not be further described. A replica $h'_m(u,v)$ of the HDTV motion auxiliary signal $h_m(u,v)$ appears at its output.

The spatial signal $h'_s(u,v)$ thus obtained and the motion auxiliary signal $h'_m(u,v)$ form the desired interlaced HDTV signal after combination in a combination circuit 24.

Figure 12:
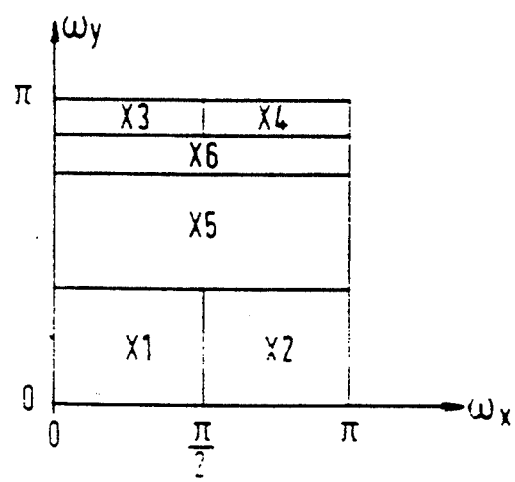
FIG. 12 shows a HDTV frequency spectrum to explain the operation of the device of FIG. 10.
Figure 11:
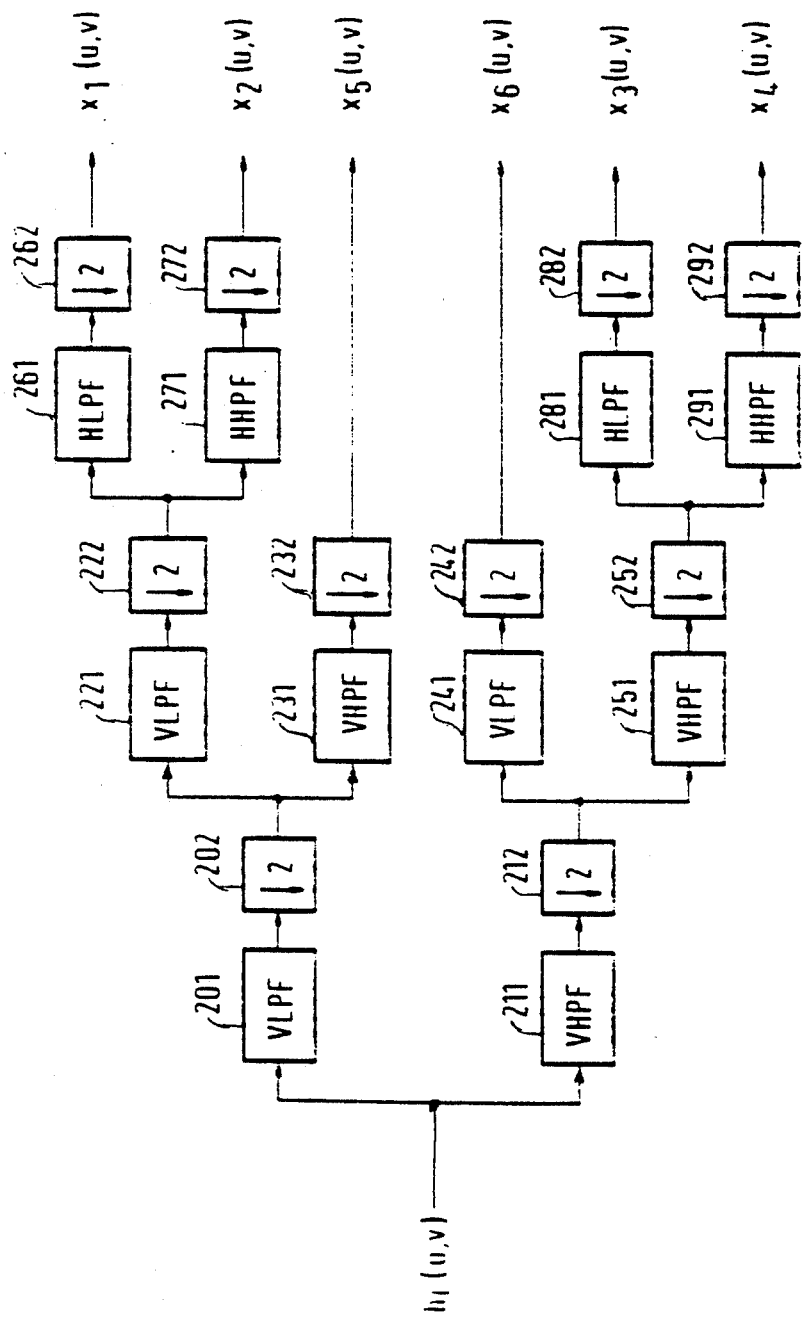
FIG. 11 shows a further embodiment of a device for compatible transmission.

FIG. 11 shows a further embodiment of a device for compatible transmission of HDTV and SDTV signals. The HDTV signal is first split into a HDTV spatial signal and a HDTV motion signal by means of vertical filters 201 and 211, followed by vertical subsamplers 202 and 212. By way of example it has been assumed in this device that the spatial signal has a bandwidth of $\frac{3}{4}\pi$ and the spatial signal has a bandwidth of $\frac{1}{4}\pi$. Both signals are subsequently further split by means of vertical filters 221-251 and subsamplers 222-252. The output signals of subsamplers 222 and 252 are split in the horizontal direction by means of horizontal filters 261-291 and horizontal subsamplers 262-292. Thus, 6 signals $x_1(u,v)$-$x_6(u,v)$ are generated which together represent the full HDTV signal and of which $x_1(u,v)$ together with $x_3(u,v)$ represent the SDTV signal. FIG. 12 shows the parts of the HDTV spectrum corresponding to these signals.

It is to be noted that the devices shown in FIGS. 9 and 11 can be modified in such a way that the SDTV signal is already reconstructed at the transmitter end. In that case the signals $x_1(u,v)$ and $x_3(u,v)$ are combined and transmitted as SDTV signal $s_i(u,v)$. The SDTV signal is then available at the receiver end without any further processing. In practice this may prove to be useful if digital standard receivers having an input for the $s_i(u,v)$ signal were already available on the market.

Figure 13:
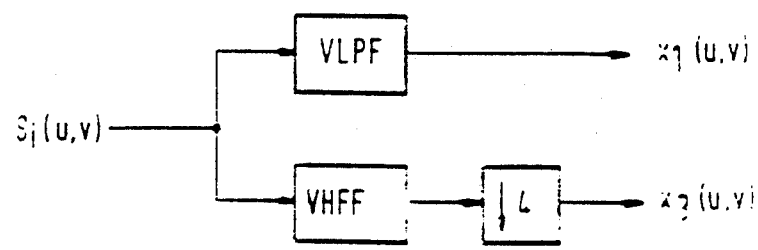
FIG. 13 shows an embodiment of a circuit for regaining HDTV auxiliary signals from an SDTV signal.

FIG. 13 shows diagrammatically an example of the provisions which have to be made at the receiver end in this case for regaining the sub-signals $x_1(u,v)$ and $x_3(u,v)$ from the received signal $s_i(u,v)$, which sub-signals are required for reconstructing the HDTV signal.

9. General remarks

In the embodiments described 1-dimensional filters are shown. Such filters only have a filter action for horizontal or vertical frequencies. When combined, they have a 2-dimensional filter action in a frequency range which forms, as it were, a rectangle. However, 2-dimensional filters which act simultaneously in the horizontal and vertical directions are known from literature. Such filters may also be used. More particularly, "diamond-shape" filters are suitable for use in the device according to the invention.

We claim:

1. A device for splitting a digital interlaced television signal into components, which device has an input for receiving interlaced frames of the television signal, said input being coupled to
 a first filter having a vertical low-pass filter action for generating a component which represents a spatial signal,
 a second filter having a vertical high-pass filter action for generating a component which represents a motion auxiliary signal,
the vertical filter frequencies of the first and the second filter being not both equal to $\frac{1}{2}\pi$ in which $\pi$ corresponds to half the vertical sampling frequency.

2. A device as claimed in claim 1, characterized in that the vertical filter frequency of the second filter is substantially higher than the vertical filter frequency of the first filter.

3. A device as claimed in claim 1, characterized in that the vertical filter frequency of the second filter is larger than $\frac{1}{2}\pi$.

4. A device as claimed in claim 1 in which the television signal represents a high-definition television signal, characterized in that the first filter and the second filter are coupled to horizontal low-pass filter means and are further coupled to subsampler means for generating a low-pass spatial signal and a low-pass motion auxiliary signal which constitute the components of an interlaced low-definition television signal.

5. A device as claimed in claim 4, characterized in that the first filter and the second filter are further coupled to horizontal high-pass filter means and subsampler means for generating a high-pass spatial signal and a high-pass motion auxiliary signal which together with the low-pass spatial signal and the low-pass motion auxiliary signal constitute the components of the high-definition television signal.

6. A device as claimed in claim 5, characterized in that the low-pass spatial signal and the low-pass motion auxiliary signal are combined to constitute a low-definition television signal.

7. A device as claimed in claim 4, characterized in that the horizontal filter means and the first filter and the second filter are formed by 2-dimensional filters.

8. A device for reconstructing an interlaced television signal from a spatial signal and a motion auxiliary signal as obtained from a device as claimed in claim 1, characterized in that the spatial signal and the motion auxiliary signal are applied to a combination circuit.

9. A device for reconstructing said interlaced low-definition television signal from said low-pass spatial signal and said low-pass motion auxiliary signal as obtained from a device as claimed in claim 4, characterized in that the low-pass motion auxiliary signal is coupled to a modulator for forming a modulated motion auxiliary signal which, together with the low-pass spatial signal is applied to a combination circuit.

10. A device as claimed in claim 9, characterized in that the modulator is formed by a vertical upsampler and a vertical high-pass filter.

11. A device for reconstructing said high-definition television signal from said low-pass spatial signal, said low-pass motion auxiliary signal, said high-pass spatial signal and said high-pass motion auxiliary signal as obtained from a device as claimed in claim 5, characterized in that the low-pass spatial signal and the high-pass spatial signal are applied to a combination circuit for regaining the spatial signal, in that the low-pass motion auxiliary signal and the high-pass motion auxiliary signal are applied to a combination and modulation circuit for regaining the motion auxiliary signal, and in that the spatial signal and the motion auxiliary signal are applied to a combination circuit for reconstructing the high-definition television signal.

12. A device as claimed in claim 11, characterized in that the low-pass spatial signal and the low-pass motion auxiliary signal are obtained by vertically splitting a low-definition television signal which was obtained from a device which combined a low-pass spatial signal and a low-pass motion auxiliary signal to form the low-definition television signal.

13. A device as claimed in claim 2, characterized in that the vertical filter frequency of the second filter is larger than $\frac{1}{2}\pi$.

14. A device as claimed in claim 5, characterized in that the horizontal filter means and the first filter and the second filter are formed by 2-dimensional filters.

15. A device as claimed in claim 6, characterized in that the horizontal filter means and the first filter and the second filter are formed by 2-dimensional filters.

16. A device for reconstructing said interlaced said low-definition television signal from said low-pass spatial signal and said low-pass motion auxiliary signal as obtained from a device as claimed in claim 5, characterized in that the low-pass motion auxiliary signal is coupled to a modulator for forming a modulated motion auxiliary signal which, together with the low-pass spatial signal is applied to a combination circuit.

17. A device as claimed in claim 16, characterized in that the modulator is formed by a vertical upsampler and a vertical high-pass filter.

* * * * *